US007331175B2

(12) United States Patent
VerKuilen et al.

(10) Patent No.: US 7,331,175 B2
(45) Date of Patent: Feb. 19, 2008

(54) HYDRAULIC SYSTEM HAVING AREA CONTROLLED BYPASS

(75) Inventors: Michael Todd VerKuilen, Metamora, IL (US); Shoji Tozawa, Peoria, IL (US)

(73) Assignees: Caterpillar Inc., Peoria, IL (US); Shin Caterpillar Mitsubishi Ltd. (JP)

( * ) Notice: Subject to any disclaimer, the term of this patent is extended or adjusted under 35 U.S.C. 154(b) by 0 days.

(21) Appl. No.: 11/214,930

(22) Filed: Aug. 31, 2005

(65) Prior Publication Data

US 2007/0044463 A1 Mar. 1, 2007

(51) Int. Cl.
*F16D 31/02* (2006.01)

(52) U.S. Cl. .......................................... 60/429; 60/468

(58) Field of Classification Search .................. 60/422, 60/429, 430, 445, 468, 486
See application file for complete search history.

(56) References Cited

U.S. PATENT DOCUMENTS 3,366,202 A 1/1968 James.
4,046,270 A 9/1977 Baron et al.
4,222,409 A 9/1980 Budzich
4,250,794 A 2/1981 Haak et al.
4,416,187 A 11/1983 Nystrom
4,437,385 A 3/1984 Kramer et al.
4,480,527 A 11/1984 Lonnemo
4,581,893 A 4/1986 Lindbom
4,586,330 A 5/1986 Watanabe et al.
4,623,118 A 11/1986 Kumar
4,662,601 A 5/1987 Andersson
4,706,932 A 11/1987 Yoshida et al.
4,747,335 A 5/1988 Budzich
4,799,420 A 1/1989 Budzich
5,079,919 A 1/1992 Nakamura et al.
5,137,254 A 8/1992 Aardema et al.
5,148,676 A * 9/1992 Moriya et al. ................ 60/429
5,152,142 A 10/1992 Budzich
5,211,196 A 5/1993 Schwelm
5,212,950 A 5/1993 Shirai et al.
5,277,027 A 1/1994 Aoyagi et al.
5,287,794 A 2/1994 Andersson
5,297,381 A 3/1994 Eich et al.
5,313,873 A 5/1994 Gall et al.
5,350,152 A 9/1994 Hutchison et al.

(Continued)

FOREIGN PATENT DOCUMENTS

EP 1 022 395 A1 7/2000

(Continued)

OTHER PUBLICATIONS

International Search Report and Written Opinion (10 pages).

*Primary Examiner*—Michael Leslie
(74) *Attorney, Agent, or Firm*—Finnegan, Henderson, Farabow, Garrett & Dunner

(57) ABSTRACT

The present disclosure is directed to a hydraulic system having a first source of pressurized fluid and at least one fluid actuator. The hydraulic system further includes a first valve disposed between the first source and the at least one fluid actuator. The first valve is configured to selectively communicate pressurized fluid from the first source to a tank in response to a first command. The first command is at least partially based on a predetermined flow area of the first valve.

21 Claims, 3 Drawing Sheets

U.S. PATENT DOCUMENTS

| | | | | |
|---|---|---|---|---|
| 5,366,202 | A | | 11/1994 | Lunzman |
| 5,447,093 | A | | 9/1995 | Budzich |
| 5,477,677 | A | | 12/1995 | Krnavek |
| 5,537,818 | A | | 7/1996 | Hosseini et al. |
| 5,540,049 | A | | 7/1996 | Lunzman |
| 5,553,452 | A | | 9/1996 | Snow et al. |
| 5,568,759 | A | | 10/1996 | Aardema |
| 5,678,470 | A | | 10/1997 | Koehler et al. |
| 5,680,760 | A | * | 10/1997 | Lunzman ..................... 60/468 |
| 5,701,933 | A | | 12/1997 | Lunzman |
| 5,813,226 | A | | 9/1998 | Krone |
| 5,813,309 | A | | 9/1998 | Taka et al. |
| 5,857,330 | A | | 1/1999 | Ishizaki et al. |
| 5,868,059 | A | | 2/1999 | Smith |
| 5,873,244 | A | | 2/1999 | Cobo et al. |
| 5,878,647 | A | | 3/1999 | Wilke et al. |
| 5,890,362 | A | | 4/1999 | Wilke |
| 5,947,140 | A | | 9/1999 | Aardema et al. |
| 5,960,695 | A | | 10/1999 | Aardema et al. |
| 5,974,796 | A | | 11/1999 | Ishikawa et al. |
| 6,009,708 | A | | 1/2000 | Miki et al. |
| 6,026,730 | A | | 2/2000 | Yoshida et al. |
| 6,082,106 | A | | 7/2000 | Hamamoto |
| 6,173,572 | B1 | | 1/2001 | Cobo et al. |
| 6,216,456 | B1 | | 4/2001 | Mitchell |
| 6,308,516 | B1 | | 10/2001 | Kamada |
| 6,367,365 | B1 | | 4/2002 | Weichert et al. |
| 6,467,264 | B1 | | 10/2002 | Stephenson et al. |
| 6,502,393 | B1 | | 1/2003 | Stephenson et al. |
| 6,502,500 | B2 | | 1/2003 | Yoshino |
| 6,516,614 | B1 | | 2/2003 | Knoll |
| 6,598,391 | B2 | | 7/2003 | Lunzman et al. |
| 6,619,183 | B2 | | 9/2003 | Yoshino |
| 6,655,136 | B2 | | 12/2003 | Holt et al. |
| 6,662,705 | B2 | | 12/2003 | Huang et al. |
| 6,665,136 | B2 | | 12/2003 | Holt et al. |
| 6,691,603 | B2 | | 2/2004 | Linerode et al. |
| 6,694,860 | B2 | | 2/2004 | Yoshino |
| 6,715,402 | B2 | | 4/2004 | Pfaff et al. |
| 6,718,759 | B1 | | 4/2004 | Tabor |
| 6,725,131 | B2 | | 4/2004 | Lunzman |
| 6,732,512 | B2 | | 5/2004 | Pfaff et al. |
| 6,748,738 | B2 | | 6/2004 | Smith |
| 6,761,029 | B2 | | 7/2004 | Linerode |
| 2003/0121256 | A1 | | 7/2003 | Mather |
| 2003/0121409 | A1 | | 7/2003 | Lunzman et al. |
| 2003/0125840 | A1 | | 7/2003 | Lunzman et al. |
| 2003/0196545 | A1 | | 10/2003 | Jensen et al. |
| 2004/0055288 | A1 | | 3/2004 | Pfaff et al. |
| 2004/0055289 | A1 | | 3/2004 | Pfaff et al. |
| 2004/0055452 | A1 | | 3/2004 | Tabor |
| 2004/0055453 | A1 | | 3/2004 | Tabor |
| 2004/0055454 | A1 | | 3/2004 | Pfaff et al. |
| 2004/0055455 | A1 | | 3/2004 | Tabor et al. |

FOREIGN PATENT DOCUMENTS

| | | | | |
|---|---|---|---|---|
| EP | 1 536 071 | A1 | | 6/2005 |
| JP | 02613041 | B2 | | 5/1997 |
| JP | 11303809 | A | * | 11/1999 |

* cited by examiner

HYDRAULIC SYSTEM HAVING AREA CONTROLLED BYPASS

TECHNICAL FIELD

The present disclosure is directed to a hydraulic system and, more particularly, to a hydraulic system having area controlled bypass.

BACKGROUND

Work machines such as, for example, excavators, dozers, loaders, motor graders, and other types of heavy machinery typically use one or more hydraulic actuators to accomplish a variety of tasks. The actuators are fluidly connected to one or more pumps that provide pressurized fluid to chambers within the actuators. An electro-hydraulic valve arrangement is typically connected between the pumps and the actuators to control a flow rate and direction of pressurized fluid to and from the chambers of the actuators.

The electro-hydraulic valve arrangements often include either single-valve or multi-valve arrangements. Single valve arrangements typically include a valve having only two positions with fixed flow areas to direct flow into and out of the chambers. Single-valve arrangements may also include a bypass orifice which directs fluid flow from the pump to a reservoir which may provide a desired feedback to an operator. Operator feedback may occur during a resistive movement of the actuator, such as when the load on the actuator increases, e.g., when a work implement transitions from soft soil to hard soil. A resistive movement of the actuator increases the pressure within the hydraulic system which causes an increase in fluid flow through the bypass orifice to the reservoir. As such, an operator may sense a slower movement of the actuator and/or a machine component, may sense the need to further actuate a control lever to move an associated component, may sense an engine surge to increase the supply of fluid to the hydraulic system, and/or may sense a variety of other operational changes.

Multi-valve arrangements provide increased flexibility over single-valve arrangements by allowing independent control of fluid into and out of each chamber of an actuator. Multi-valve arrangements may not, however, include bypass orifices and thus may adversely affect feedback to an operator during work machine operation.

Additionally, the pumps that may supply fluid to the actuators often require a continuous flow of fluid therethrough to maintain lubrication and cooling of the pump. Furthermore, in multi-pump systems, some actuators may only require pressured fluid from one pump, while other actuators may require pressurized fluid from more than one pump. Accordingly, unnecessary fluid flow may be supplied within portions of a hydraulic system, resulting in unwanted pressure increases, and/or wasted energy.

U.S. Pat. No. 5,540,049 ("the '049 patent") issued to Lunzman discloses a control system and method for a hydraulic actuator. The '049 patent includes a hydraulic system having a variable flow hydraulic pump delivering fluid under pressure to the hydraulic actuator. The '049 patent also includes a closed center valve that operates to control a flow of the hydraulic fluid to the hydraulic actuator and a separate bypass valve that operates to control a flow of the hydraulic fluid to a fluid reservoir. A control system, having a separate bypass controller that calculates the effect of a closed center valve stroke signal, responsively controls the separate bypass valve. The separate bypass controller calculates the effect of the closed center valve stroke signal and derives a signal based on pressure modulation to control the separate bypass valve.

Although the '049 patent may include a separate bypass valve to control the flow of pressurized fluid to a reservoir, it may bypass flow that is required by the actuator which may undesirably lower the movement speed of the hydraulic actuator. Additionally, the '049 may require a complex pump and valve control system.

The present disclosure is directed to overcoming one or more of the problems set forth above.

SUMMARY OF THE INVENTION

In a first aspect, the present disclosure is directed to a hydraulic system. The hydraulic system includes a first source of pressurized fluid and at least one fluid actuator. The hydraulic system further includes a first valve disposed between the first source and the at least one fluid actuator. The first valve is configured to selectively communicate pressurized fluid from the first source to a tank in response to a first command. The first command is at least partially based on a predetermined flow area of the first valve.

In another aspect, the present disclosure is directed to a method of operating a hydraulic system. The method includes pressurizing a fluid and directing the pressurized fluid toward a first valve. The first valve has a first flow passageway and a first valve stem. The method also includes selectively directing an amount of the pressurized fluid through the flow passageway to a tank. The method further includes selectively varying the area of the flow passageway at least partially in response to an operator input and a predetermined flow area of the first valve.

DETAILED DESCRIPTION

Figure 1:
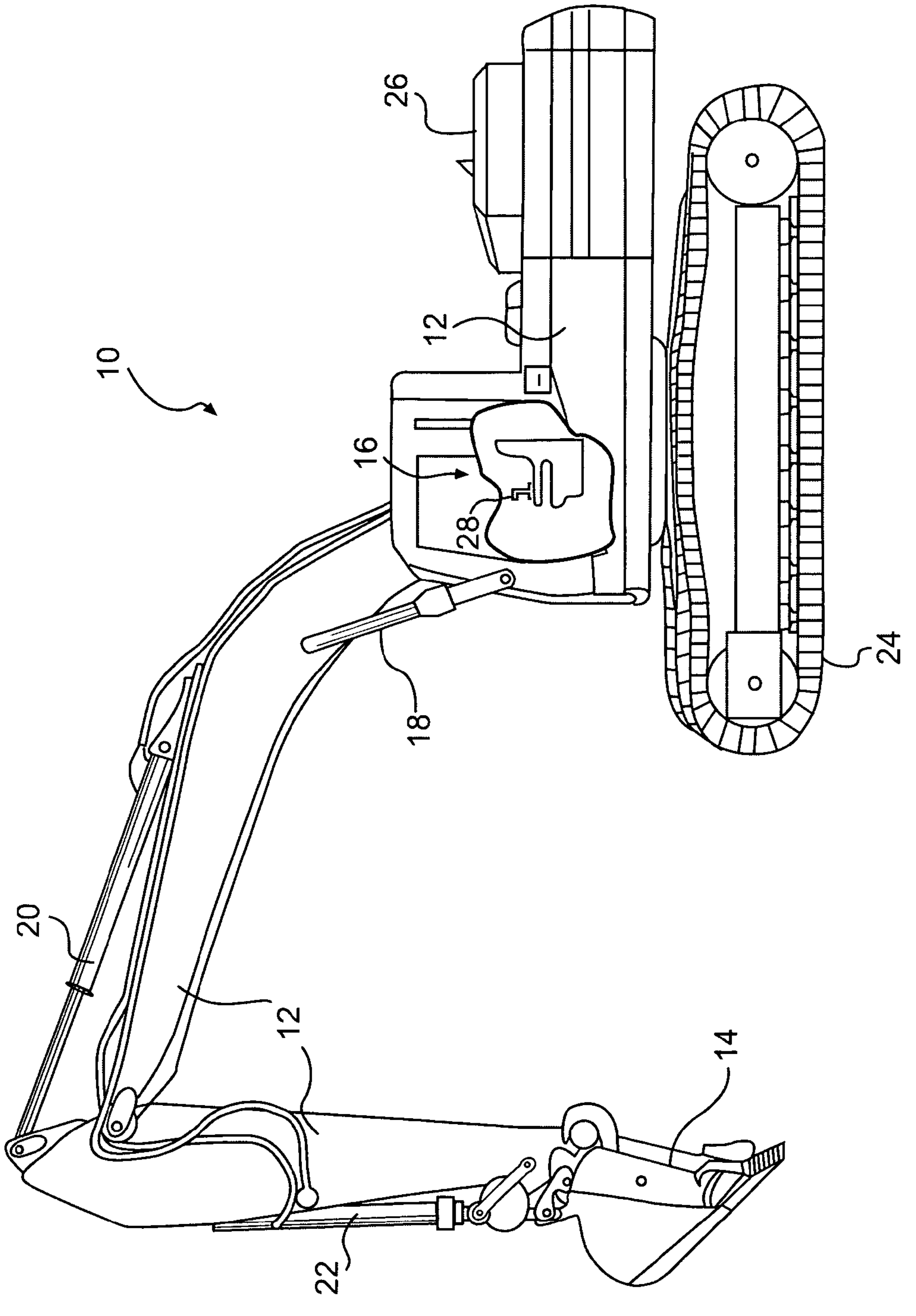
FIG. 1 is a side view diagrammatic illustration of an exemplary disclosed work machine.

FIG. 1 illustrates an exemplary work machine 10. Work machine 10 may be a fixed or mobile machine that performs some type of operation associated with an industry such as, for example, mining, construction, farming, or any other industry known in the art. For example, work machine 10 may be an earth moving machine such as an excavator, a backhoe, a loader, a dozer, a motor grader, or any other earth moving machine. Work machine 10 may include a frame 12, a work implement 14, hydraulic actuators 18, 20, 22, an operator interface 16, a traction device 24, and a power source 26.

Frame 12 may include any structural unit that supports work machine 10. Frame 12 may be, for example, a stationary base frame connecting power source 26 to traction device 24, a movable frame member of a linkage system connecting work implement 14 to traction device 24 and power source 26, or any other type of frame known in the art.

Work implement 14 may include any device used in the performance of a task and may be controllable by operator interface 16. For example, work implement 14 may include a blade, a bucket, a shovel, a ripper, a propelling device, and/or any other task-performing device known in the art. Work implement 14 may be connected to frame 12 via a direct pivot, via a linkage system with hydraulic actuators 18, 20, 22 forming one or more members in the linkage system, or in any other appropriate manner. Work implement 14 may be configured to pivot, rotate, slide, swing, and/or move relative to frame 12 in any other manner known in the art.

Operator interface 16 may be configured to receive input from an operator indicative of a desired operation, such as, for example, movement of work implement 14, movement of traction device 24, movement of frame 12, and/or any other suitable operation of work machine 10. Specifically, operator interface 16 may include one or more operator interface devices 28 that may include proportional-type controllers configured to position and/or orient components of work machine 10, such as, for example, a multi-axis joystick located to one side of an operator station. It is contemplated that additional and/or different operator interface devices 28 may be included within operator interface 16 such as, for example, wheels, knobs, push-pull devices, switches, pedals, and other operator interface devices known in the art.

Hydraulic actuators 18, 20, 22 may each include a piston-cylinder arrangement, a hydraulic motor, and/or any other known hydraulic actuator having one or more fluid chambers therein. For example, hydraulic actuators 18, 20, 22 may each include a tube defining a cylinder and a piston separating the cylinder into a first chamber and a second chamber. Pressurized fluid may be selectively supplied to the first and second chambers to create a pressure differential across the piston affecting movement of the piston relative to the tube. The resulting expansion and retraction of each of hydraulic actuators 18, 20, 22 may function to assist in moving frame 12 and/or work implement 14.

Traction device 24 may include tracks located on each side of work machine 10 (only one side shown). Alternately, traction device 24 may include wheels, belts, or other traction devices. Traction device 24 may or may not be steerable. It contemplated that traction device 24 may be hydraulically controlled, mechanically controlled, electronically controlled, or controlled in any other suitable manner.

Power source 26 may include an engine such as, for example, a diesel engine, a gasoline engine, a gaseous fuel driven engine, or any other engine known in the art. Power source 26 may be configured to supply energy to the various components of work machine 10, such as, for example, traction device 24. It is contemplated that power source 26 may alternately include another source of power such as a fuel cell, a power storage device, an electric or hydraulic motor, and/or another source of power known in the art.

Figure 2:
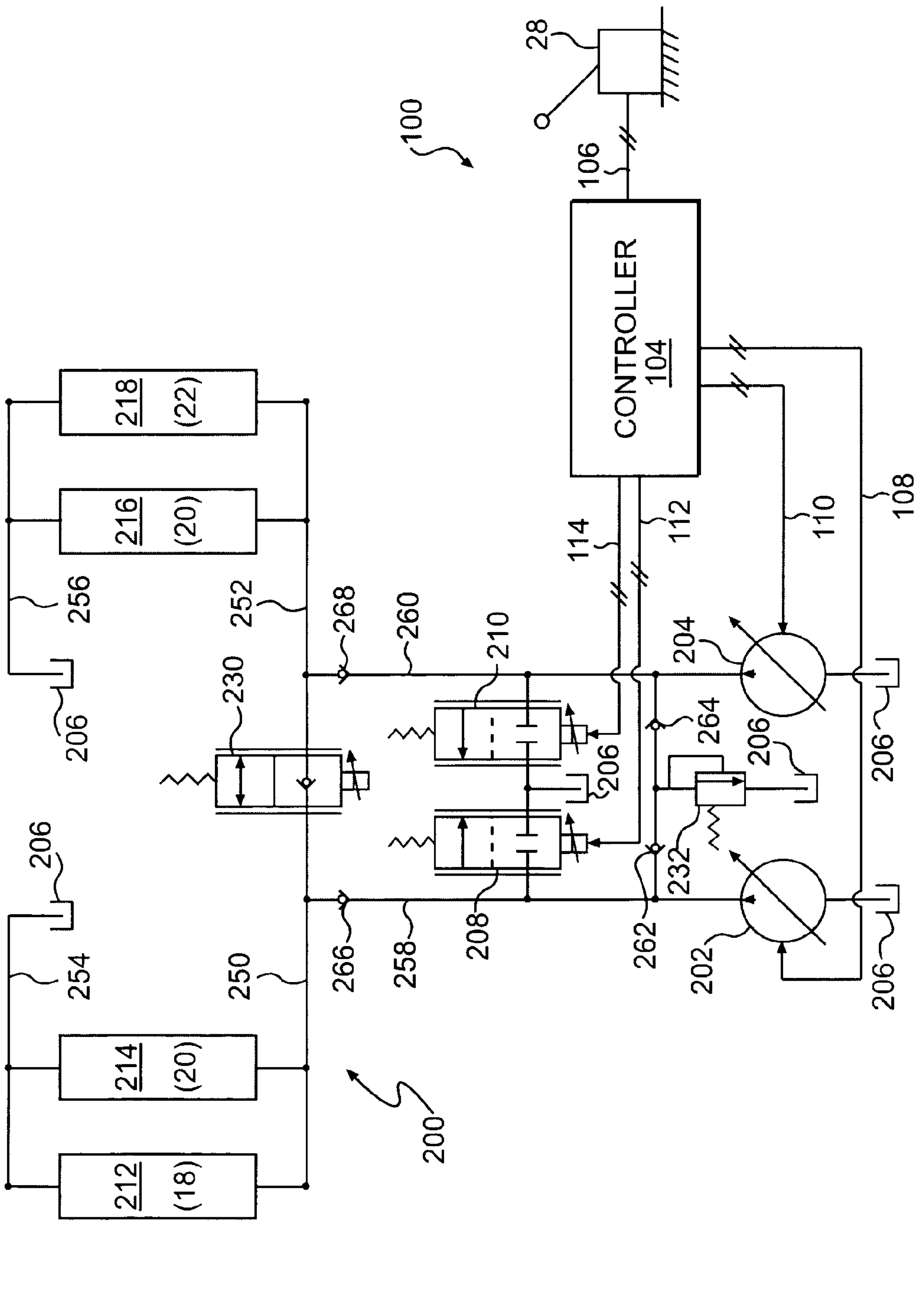
FIG. 2 is a schematic illustration of an exemplary hydraulic system of the work machine of FIG. 1.

As illustrated in FIG. 2, work machine 10 may further include a control system 100 and a hydraulic system 200 to affect the operation of work machine 10. Control system 100 may include various components that cooperate to affect the operation of hydraulic system 200. Specifically, control system 100 may be configured to receive operator inputs via operator interface devices 28 and operate one or more components of hydraulic system 200 in response thereto. Hydraulic system 200 may include various components that cooperate to affect the operation of one or more components of work machine 10. Specifically, hydraulic system 200 may be configured to manipulate the pressure and/or flow of a pressurized fluid to affect movement of hydraulic actuators 18, 20, 22 and, as a result, affect movement of, for example, work implement 14 and/or frame 12.

Control system 100 may include a controller 104 and communication lines 106, 108, 110, 112, and 114. Controller 104 may include a single microprocessor or multiple microprocessors configured to control the operation of hydraulic system 200. Controller 104 may include a memory, a data storage device, a communications hub, and/or other components known in the art. It is contemplated that controller 104 may be configured as a separate controller and/or be integrated within a general work machine control system capable of controlling various additional functions of work machine 10.

Controller 104 may be configured to receive inputs from operator interface device 28 via communication line 106. Controller 104 may also be configured to access one or more relational databases, such as, for example, maps, equations, and/or look-up tables. Controller 104 may command a first and second source 202, 204 of pressurized fluid and a first and second bypass valve 208, 210 based on the received inputs and the accessed databases. For example, controller 104 may issue area commands, via communication lines 112, 114 to first and second bypass valves 208, 210, respectively. Controller 104 may also issue flow commands, via communication lines 108, 110 to operate first and second sources 202, 204, respectively.

Hydraulic system 200 may include, in addition to first and second sources 202, 204 and first and second bypass valves 208, 210, a tank 206, hydraulic components 212, 214, 216, 218, combiner valve 230, a relief valve 232, and check valves 262, 264, 266, 268. Hydraulic system 200 may further include several passageways 250, 252, 254, 256, 258, 260 fluidly connecting the various components thereof. Hydraulic system 200 may be configured to selectively direct the flow of pressurized fluid from first and second sources 202, 204 to selectively affect movement of hydraulic actuators 18, 20, 22. It is contemplated that hydraulic system 200 may include additional and/or different components such as, for example, pressure sensors, temperature sensors, position sensors, restrictive orifices, accumulators, and/or other components known in the art.

First and second sources 202, 204 may be configured to produce a flow of pressurized fluid and may include a variable displacement pump such as, for example, a swash plate pump, a variable pitch propeller pump, and/or other sources of pressurized fluid known in the art. First and second sources 202, 204 may be drivably connected to power source 26 by, for example, a countershaft, a belt, an electrical circuit, or in any other suitable manner. First and second sources 202, 204 may be disposed between tank 206 and hydraulic components 212, 214, 216, 218.

Tank 206 may include a reservoir configured to hold a supply of fluid. The fluid may include, for example, a dedicated hydraulic oil, an engine lubrication oil, a transmission lubrication oil, or any other working fluid known in the art. One or more hydraulic systems within work machine 10 may draw fluid from and return fluid to tank 206. It is also contemplated that hydraulic system 200 may be connected to multiple separate fluid tanks.

First and second bypass valves 208, 210 may each be configured to regulate a flow of pressurized fluid to tank 206. First bypass valve 208 may be disposed between first source 202 and first upstream passageway 250. Second bypass valve 210 may be disposed between second source 204 and second upstream passageway 252. Specifically, first and second bypass valves 208, 210 may each include a spring biased valve stem supported in a valve bore. The valve stem may be solenoid actuated and configured to proportionally move between a first position at which fluid flow is blocked from flowing to tank 206 and a second position at which a maximum fluid flow is allowed to flow to tank 206. Proportional movement of the valve stem between the first position and the second position may allow an increasing flow of pressurized fluid to flow to tank 206. It is contemplated that the proportional valve stem may vary the flow of pressurized fluid in any manner known in the art, such as, for example, linearly. It is also contemplated that first and second bypass valves 208, 210 may alternately be hydraulically actuated, mechanically actuated, pneumatically actuated, or actuated in any other suitable manner.

Hydraulic components 212, 214, 216, 218 may each include one or more valves and/or fluid passageways configured to selectively communicate pressurized fluid from a respective one of first and second upstream passageways 250, 252 to an associated hydraulic actuator 18, 20, 22 and selectively communicate pressurized fluid from an associated hydraulic actuator 18, 20, 22 to a respective one of first and second downstream passageways 254, 256. Pressurized fluid communicated to and from associated hydraulic actuators 18, 20, 22 may affect movement thereof. It is contemplated that two or more hydraulic components 212, 214, 216, 218 may cooperate to jointly affect movement of a single hydraulic actuator. It is also contemplated that controller 104 may control the operation of hydraulic components 212, 214, 216, 218. For clarification purposes, only hydraulic component 212 will be explained below. It is noted, however, that explanation thereof is applicable to hydraulic components 214, 216, 218.

Hydraulic component 212 may include a single- or multi-valve arrangement configured to selectively communicate pressurized fluid from first upstream passageway 250 to the first and second chambers of hydraulic actuator 18 and to selectively communicate pressurized fluid from the first and second chambers of hydraulic actuator 18 to first downstream passageway 254 to affect movement of hydraulic actuator 18. For example, hydraulic component 212 may include first and second component valves to direct pressurized fluid from upstream passageway 250 to the first and second chambers of hydraulic actuator 18, respectively and may include third and fourth component valves to direct pressurized fluid from the first and second chambers of hydraulic actuator 18 to first downstream passageway 254. It is contemplated that elements of hydraulic component 212 may be controlled by controller 104 and/or by a separate controller. It is also contemplated that hydraulic component 212 may further include various other components, such as, pressure sensors, accumulators, temperature sensors, and/or other components known in the art.

First upstream passageway 250 and second upstream passageway 252 may be fluidly connected by combiner valve 230. Combiner valve 230 may include a spring biased valve stem supported in a valve bore. The valve stem may be solenoid actuated and configured to move between a first position and a second position. Combiner valve 230 may, in the first position, allow fluid to flow from first upstream passageway 250 to second upstream passageway 252 and block fluid flow from second upstream passageway 252 to first upstream passageway 250, by, for example, an appropriately orientated check valve. Combiner valve 230 may, in the second position, allow pressurized fluid to freely flow to and from both first and second upstream passageways 250, 252. It is contemplated that combiner valve 230 may be controlled by controller 104, and may be hydraulically actuated, mechanically actuated, pneumatically actuated, or actuated in any other suitable manner. It is also contemplated that combiner valve 230 may alternatively include a two position valve configured to move between a fist position allowing fluid to flow between first upstream passageway 250 and second upstream passageway 252 and a second position blocking fluid flow between first upstream passageway 250 and second upstream passageway 252. It is further contemplated that combiner valve 230 may include any number of positions each configured to allow, substantially block in both directions, and/or substantially block in a single direction fluid flow between first and second upstream passageways 250, 252

Relief valve 232 may be fluidly connected downstream of first and second sources 202, 204. Relief valve 232 may have a valve element spring biased toward a valve closing position and movable to a valve opening position in response to a pressure downstream of first and second sources 202, 204 being above a predetermined pressure. In this manner, relief valve 232 may be configured to reduce a pressure spike within hydraulic system 200 by allowing pressurized fluid to drain to tank 206.

Hydraulic system 200 may further include several check valves 262, 264, 266, 268 to control the flow of the pressurized fluid. Specifically, hydraulic system 200 may include a first check valve 262 to allow flow from first fluid passageway 258 to relief valve 232 and to block flow from relief valve 232 to first fluid passageway 258. Similarly, hydraulic system 200 may include a second check valve 264 to allow flow from second fluid passageway 260 to relief valve 232 and to block flow from relief valve 232 to second fluid passageway 260. Accordingly, first and second check valves 262, 264 may prohibit flow of pressurized fluid from tank 206 to first and second fluid passageways 258, 260. Hydraulic system 200 may also include a third check valve 266 to allow flow of pressurized fluid from first fluid passageway 258 to first upstream fluid passageway 250 and block flow of pressurized fluid from first upstream fluid passageway 250 to first fluid passageway 258. Similarly, hydraulic system 200 may include a fourth check valve 268 to allow flow of pressurized fluid from second fluid passageway 260 to second upstream fluid passageway 252 and to block flow of pressurized fluid from second upstream fluid passageway 252 to second fluid passageway 260. Accordingly, third and fourth check valves 266, 268 may prohibit flow of pressurized fluid from first source 202 to second bypass valve 210 and prohibit flow of pressurized fluid from second source 204 to first bypass valve 208.

Figure 3:
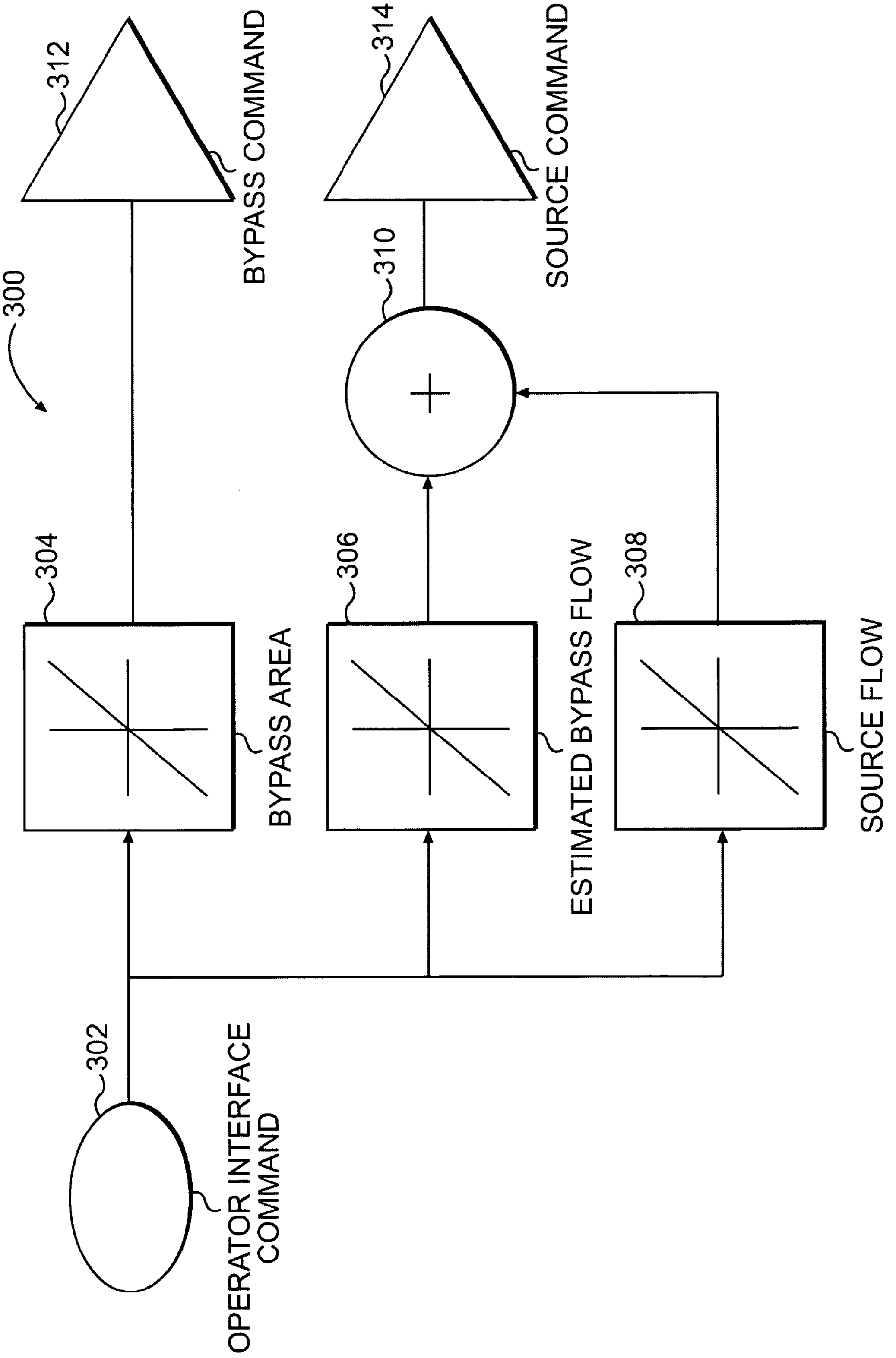
FIG. 3 is a schematic illustration of an exemplary control algorithm for the bypass valves of the hydraulic system of FIG. 2.

FIG. 3 illustrates an exemplary algorithm 300 for controlling first and second bypass valves 208, 210. For clarification purposes only, algorithm 300 will be explained below with reference to first source 202 and first bypass valve 208. It is noted, however, that algorithm 300 is applicable to second source 204 and second bypass valve 210.

Algorithm 300 may be configured to receive input signals from operator interface device 28 and output signals to control first bypass valve 208 and first source 202. Algorithm 300 may be configured to receive an operator interface command 302, access relational database 304 to determine a bypass area and, establish a bypass command 312. Algorithm 300 may also access relational databases 306, 308 to determine an estimated bypass flow and a source flow, respectively, and add the estimated bypass flow and the source flow (step 310) to establish a source command 314. It is noted that the diagrammatic representations of relational databases 304, 306, and 308 in FIG. 3 are for illustrative purposes only and actual any relationships represented thereby may be in the form of any function, curve, table, map and/or other relationship known in the art.

Operator interface command 302 may include a signal configured to be indicative of a position of operator interface device 28. Operator interface command 302 may embody any signal, such as, for example, a pulse, a voltage level, a magnetic field, a sound or light wave, and/or other signal format known in the art. It is contemplated that operator interface command 302 may be directly or indirectly indicative of a position of a position operator interface device 28, such as, for example, being indicative of a lever position, being indicative of a pressure of fluid operating pilot valves in a secondary hydraulic circuit and/or being indicative of any other secondary command or indicator representative of a position of an operator interface device. It is also contemplated that operator interface command 302 may include a combination of component commands and/or indicators.

Relational database 304 may be configured to functionally relate operator interface positions to predetermined bypass areas. Relational database 304 may include one or more relational maps that may be in the form of, for example, a two- or three-dimensional look-up table and/or an equation and may relate any number of inputs to establish a bypass area. Specifically, relational database 304 may include a look-up table relating operator interface positions to predetermined bypass areas to provide a desired amount of flow area through which pressurized fluid may flow. The desired amount of flow area may correspond to the amount of feedback provided to an operator. For example, a particular operator interface command 302 may establish a particular bypass command 312 to establish a desired flow area of first bypass valve 208 to provide a desired feedback to an operator. It is contemplated that interpolation and/or an equation may be used to relate received operator interface signals and operator interface signals within the look-up table. It is also contemplated that relational database 304 may be populated with data determined from test equipment, data from predetermined relationships, data selected or desired by one or more operators, and/or data determined by any other suitable manner.

Relational database 306 may be configured to functionally relate operator interface positions to estimated bypass flows. Relational database 306 may include one or more relational maps that may be in the form of, for example, a two- or three-dimensional look-up table and/or an equation and may relate any number of inputs to establish an estimated bypass flow. Specifically, relational database 306 may include a look-up table relating operator interface positions to predetermined estimated bypass flows. For example, a particular operator interface command 302 may establish an estimated bypass flow based in part on the determined bypass area and the estimated flow of pressurized fluid therethrough. It is contemplated that relational database 306 may alternatively include a look-up table relating bypass areas to estimated bypass flows. It is also contemplated that interpolation and/or an equation may be used to relate received operator interface signals and estimated bypass flows within the look-up table. It is further contemplated that relational database 304 may be populated with data determined from test equipment, data from predetermined relationships, data selected or desired by one or more operators, and/or data determined by any other suitable manner.

Relational database 308 may be configured to functionally relate operator interface positions and source flows. Relational database 308 may include one or more relational maps that may be in the form of, for example, a two- or three-dimensional look-up table and/or an equation and may relate any number of inputs to establish a source flow. Specifically relational database 308 may include a look-up table relating operator interface positions to predetermined source flows. For example, a particular operator interface command 302 may establish a source flow based in part on the desired flow or amount of pressurized fluid required to operate one or more of hydraulic actuators 18, 20, 22. It is contemplated that interpolation and/or an equation may be used to relate received operator interface signals and estimated bypass flows within the look-up table. It is also contemplated that relational database 304 may be populated with data determined from test equipment, data from predetermined relationships, data selected or desired by one or more operators, and/or data determined by any other suitable manner.

Control algorithm 300 may add the determined estimated bypass flow and the determined source flow for a given operator interface command 302. The determined estimated bypass flow and the determined source flow may be added by combining the respective flows into a single flow command. For example, the determined estimated bypass flow and the determined source flow may be summed together to establish a single source command 314. Adding the estimated bypass flow and the source flow may provide an appropriate amount of pressurized fluid to hydraulic system 200 to satisfy both an actuator requirement and a bypass valve requirement.

Bypass command 312 may include a signal configured to energize the solenoid associated with bypass valve 208 to move the valve stem of bypass valve 208 relative to the valve bore of bypass valve 208 to vary the flow area thereof. Bypass command 312 may embody any signal, such as, for example, a pulse, a voltage level, a magnetic field, a sound or light wave, and/or other signal format known in the art. Source command 314 may include a signal configured to actuate source 202 to move components thereof to vary the flow rate and/or pressure of source 202. Source command 314 may embody any signal, such as, for example, a pulse, a voltage level, a magnetic field, a sound or light wave, and/or other signal format known in the art.

INDUSTRIAL APPLICABILITY

The disclosed hydraulic system may be applicable to any work machine that includes a hydraulic actuator. The disclosed hydraulic system may reduce energy necessary to operate the hydraulic actuator, may provide appropriate operator feedback, may be applicable to multi-source systems, and/or may provide a simple bypass control configuration. The operation of hydraulic system 200 is explained below.

Referencing FIG. 2, first and second sources 202, 204 may receive fluid from tank 206 and supply pressurized fluid to first and second fluid passageways 258, 260 and first and second upstream fluid passageways 250, 252, respectively. As such, pressurized fluid may be supplied to upstream sides of first and second bypass valves 208, 210 and to upstream sides of each of first, second, third, and fourth hydraulic components 212, 214, 216, 218. Additionally, pressurized fluid may be supplied to both sides of combiner valve 230. Initially, first and second sources 202, 204 may supply pressurized fluid to hydraulic system 200 at a minimum pressure and flow rate. The minimum pressure and flow rate may be determined by, for example, a minimum swashplate angle of a swashplate pump. First and second bypass valves 208, 210 may each be actuated to an initial flow area at which substantially all of the minimum flow rate supplied by first and second sources 202, 204 may be directed to tank 206.

One or more of hydraulic actuators 18, 20, 22 may be movable by fluid pressure in response to operator inputs. An operator may actuate operator interface device 28 to a desired position to affect control of a component of work machine 10, such as, for example, work implement 14. Operator interface device 28 may transmit an operator interface command 302 (FIG. 3) to controller 104, via communication line 106, indicative of the relative position of operator interface device 28. Controller 104 may receive operator interface command 302 for use within algorithm 300.

Referencing FIG. 3, controller 104 may be configured to execute algorithm 300 in response to operator interface command 302. Specifically, algorithm 300 may be configured to determine a bypass area, an estimated bypass flow, and a source flow at least partially based on operator interface command 302. Algorithm 300 may determine an appropriate bypass area via relational database 304, determine an appropriate estimated bypass flow via relational database 306, and determine an appropriate source flow via operational database 308.

Algorithm 300 may further be configured to generate bypass command 312 and source command 314 at least partially based on the determined bypass area, estimated bypass flow, and source flow. Specifically, algorithm 300 may generate bypass command 312 in proportion to a desired bypass flow area. Algorithm 300 may generate source command 314 in proportion to the sum of the estimated bypass flow and the determined source flow. Algorithm 300 may sum the estimated bypass flow and the source flow to provide an appropriate amount of flow to hydraulic system 200 to perform the operation desired by an operator. For example, if the estimated bypass flow was not added to the determined source flow, one or more hydraulic actuators 18, 20, 22 may not receive the demanded flow of pressurized fluid because a portion of the source flow may be diverted to tank 206 via one or both of first and second bypass valves 208, 210 (FIG. 2).

Controller 104 may be configured to communicate bypass command 312 to one of first and second bypass valves 208, 210 via communication lines 112, 114 (FIG. 2) and may be configured to communicate source command 314 to one of first and second sources 202, 204 via communication lines 108, 110 (FIG. 2). It is contemplated that algorithm 300 may be repeated to generate a bypass command for each one of first and second bypass valves 208, 210 and to generate a source command for each one of first and second sources 202, 204. It is further contemplated that algorithm 300 may, alternatively, be configured to simultaneously determine first and second bypass commands to control first and second bypass valves 208, 210, respectively, and to determine first and second source commands to control first and second sources 202, 204, respectively.

Again referencing FIG. 2, in response to a bypass command communicated from controller 104 to first bypass valve 208 via communication line 112, the valve stem of first bypass valve 208 may be actuated to a first open position. Similarly, in response to a bypass command communicated from controller 104 to second bypass valve 210 via communication line 114, the valve stem of second bypass valve 210 may be actuated to a second open position. Additionally, first and second sources 202, 204 may be operated to deliver respective flows of pressurized fluid to first and second fluid passageways 258, 260 in response to first and second source commands communicated from controller 104 via communication lines 108, 110. Furthermore, controller 104 may control the operation of one or more of hydraulic components 212, 214, 216, 218 to selectively operate one or more of hydraulic actuators 18, 20, 22.

For example, an operator may desire extension or retraction of hydraulic actuator 18. For explanation purposes only, hydraulic component 212 may control the movement of hydraulic actuator 18. As such, operator inputs via operator interface device 28 may, via controller 104, selectively command first and second sources 202, 204 to establish first and second flows of pressurized fluid, selectively command first and second bypass valves 208, 210 to direct first and second bypass flows of pressurized fluid to tank 206, and may selectively actuate one or more valves of hydraulic component 212 to direct flows of pressurized fluid to and from hydraulic actuator 18.

The first flow of pressurized fluid from first source 202 may be directed to hydraulic component 212 via first fluid passageway 258 and first upstream passageway 250. A portion of the first flow of pressurized fluid may be directed to tank 206 through first bypass valve 208. The amount of the first flow of pressurized fluid directed to tank 206 may be directly proportional to the amount first bypass valve 208 is open, e.g., the larger the flow area of first bypass valve 208 the greater the amount of the first flow of pressurized fluid diverted to tank 206. It is contemplated that a larger flow area of first bypass valve 208 may correspond to a greater feedback provided to an operator by, for example, bypassing more flow of pressurized fluid to tank 206 during a resistive movement of hydraulic actuator 18. It is also contemplated that hydraulic actuator 18 may only require pressurized fluid from first source 202. As such, the second flow may be substantially equal to the minimum flow of pressurized fluid from second source 204 and second bypass valve 210 may remain at the initial position to continue to divert substantially all of the minimum flow of pressurized fluid from second source 204 to tank 206.

For another example, an operator may desire an extension or retraction of hydraulic actuator 20. For explanation purposes only, hydraulic components 214, 216 may control the movement of hydraulic actuator 20. As such, operator inputs via operator interface device 28 may, via controller 104, selectively command first and second sources 202, 204 to establish first and second flows of pressurized fluid, selectively command first and second bypass valves 208, 210 to direct first and second bypass flows of pressurized fluid to tank 206, and may selectively actuate one or more valves of hydraulic components 214, 216 to direct flows of pressurized fluid to and from hydraulic actuator 20. It is contemplated that hydraulic actuator 20 may require flow of pressurized fluid from both first and second sources 202, 204 for actuation thereof. It is also contemplated that hydraulic actuator 20 may include two hydraulic actuators operating together and hydraulic component 214 may direct pressurized fluid to one of the two hydraulic actuators and hydraulic component 216 may direct pressurized fluid to the other of the two hydraulic actuators.

The first flow of pressurized fluid from first source 202 may be directed to hydraulic component 214 via first fluid passageway 258 and first upstream passageway 250. A portion of the first flow of pressurized fluid may be directed to tank 206 through first bypass valve 208. The amount of the first flow of pressurized fluid directed to tank 206 may be proportional to the amount first bypass valve 208 is open, e.g., the larger the flow area of first bypass valve 208 the greater the amount of the first flow of pressurized fluid diverted to tank 206. Because hydraulic actuator 20 may require two hydraulic components for actuation thereof, a second flow of pressurized fluid from second source 204 may be directed to hydraulic component 216 via second fluid passageway 260 and second upstream passageway 252. A portion of the second flow of pressurized fluid may be directed to tank 206 through second bypass valve 210. Similar to first bypass valve 208, the amount of the second flow of pressurized fluid directed to tank 206 may be proportion to the amount of second bypass valve 210 is open. As noted above, a larger flow area of first and/or second bypass valves 208, 210 may correspond to a greater feedback provided to an operator by, for example, bypassing a greater flow of pressurized fluid to tank 206 during a resistive movement of hydraulic actuator 20.

For yet another example, an operator may desire extension or retraction of hydraulic actuator 22. For explanation purposes only, hydraulic component 218 may control the movement of hydraulic actuator 22. As such, operator inputs via operator interface device 28 may, via controller 104, selectively command first and second sources 202, 204 to establish first and second flows of pressurized fluid, selectively command first and second bypass valves 208, 210 to direct first and second bypass flows of pressurized fluid to tank 206, and may selectively actuate one or more valves of hydraulic component 212 to direct flows of pressurized fluid to and from hydraulic actuator 22.

The second flow of pressurized fluid from second source 204 may be directed to hydraulic component 218 via second fluid passageway 260 and second upstream passageway 252. A portion of the second flow of pressurized fluid may be directed to tank 206 through second bypass valve 210. The amount of the second flow of pressurized fluid directed to tank 206 may be directly proportional to the amount second bypass valve 210 is open, e.g., the larger the flow area of second bypass valve 210 the greater the amount of the first flow of pressurized fluid diverted to tank 206. It is contemplated that a larger flow area of second bypass valve 210 may correspond to a greater feedback provided to an operator by, for example, bypassing more flow of pressurized fluid to tank 206 during a resistive movement of hydraulic actuator 22. It is also contemplated that hydraulic actuator 22 may only require pressurized fluid from second source 204. As such, the first flow may be substantially equal to the minimum flow of pressurized fluid from first source 202 and first bypass valve 208 may remain at the initial position to continue to divert substantially all of the minimum flow of pressurized fluid from first source 204 to tank 206.

In multi-function operation where, for example, more than one of hydraulic actuators 18, 20, 22 may be simultaneously actuated, multiple bypass commands may be established for each of first and second bypass valves 208, 210. It is contemplated that controller 104 may communicate the bypass command that would control a respective bypass valve to the greatest flow area. For example, if it was desired to operate both hydraulic component 212 and 218 simultaneously, component 212 may establish first bypass valve 208 to a non-minimum flow area and component 218 may establish first bypass valve 208 to the minimum flow area. As such, controller 104 may control first bypass valve 208 to the non-minimum flow area. Similarly, control of component 218 may establish second bypass valve 210 to a non-minimum flow area and component 212 may establish second bypass valve 210 to the minimum flow area. As such, second bypass valve 210 may be controlled to the non-minimum flow area. It is contemplated that controlling first and second bypass valves 208, 210 to the greatest flow area in multi-function operations may provide an appropriate feedback to an operator by, for example, ensuring that more feedback is provided to an operator rather than less feedback. It is also contemplated that in single- and/or multi-function operation, first and second bypass valves may be controlled to any flow area between a fully closed position and a fully opened position, as desired.

Combiner valve 230 may be actuated between the first position allowing fluid flow between first and second upstream fluid passageways 250, 252 and the second position blocking fluid flow from second upstream passageway 252 to first upstream passageway 250 in response to the operation of one or more of hydraulic components 212, 214, 216, 218. For example, during operation of hydraulic components 214, 216, combiner valve 230 may be in the first position to thereby allow first and second flows of pressurized fluid from first and second sources 202, 204 to combine within first and second upstream passageways 250, 252 allowing first and second sources 202, 204 to cumulatively supply a combined flow of pressurized fluid to hydraulic components 214, 216. For another example, during operation of hydraulic component 218, combiner valve 230 may be in the second position to thereby block the second flow of pressurized fluid from second source 204 from being diverted away from hydraulic component 218 and into first upstream passageway 250.

Because hydraulic system 200 includes first and second bypass valves 208, 210, it may provide improved operator feedback during operation of work machine 10. As discussed above, when movement of an actuator 18, 20, 22 is resisted by an external load, pressure within hydraulic system 200 may increase resulting in an increased flow of pressurized fluid through first and/or second bypass valve 208, 210. This increased flow may be sensed by an operator by, for example, a decrease in actuation speed, to indicate the encountered resistance. Additionally, because bypass flow and source flow may be combined, hydraulic system 200 may provide sufficient flow of pressurized fluid to a plurality of hydraulic actuators while maintaining sufficient operator feedback. Furthermore, because first and second bypass valves 208, 210 may divert the minimum flows from first and second sources 202, 204, pressure build-up within hydraulic system 200 may be reduced. Finally, controlling bypass valves 208, 210 by area commands may provide simple control of hydraulic system 200 and allow for flexible and accurate control of pressurized fluid to and from hydraulic actuators 18, 20, 22.

It will be apparent to those skilled in the art that various modifications and variations can be made to the disclosed hydraulic system having area controlled bypass. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic system comprising:
a first source of pressurized fluid;
at least one fluid actuator;
a first valve disposed between the first source and the at least one fluid actuator being configured to selectively communicate pressurized fluid from the first source to a tank in response to a first command; and
a controller configured to determine the first command by determining a plurality of commands for the first valve and selecting one of the plurality of commands as the first command.

2. The hydraulic system of claim 1 wherein the at least one fluid actuator is a first plurality of fluid actuators, the hydraulic system further including a first passageway fluidly communicating the first source, the first valve, and the first plurality of fluid actuators.

3. The hydraulic system of claim 1, wherein the controller is further configured to receive an operator input and communicate the first command to the first valve and communicate a second command to the first source.

4. The hydraulic system of claim 3, wherein the second command is at least partially based on an estimated amount of flow of pressurized fluid through the first valve and a predetermined amount of pressurized fluid flow through the first source.

5. The hydraulic system of claim 3, wherein:

the first command is determined via a look-up table relating operator inputs and displacement values of the first valve; and the second command is determined by:

estimating a first valve flow via a look-up table relating the displacement values of the first valve and first valve flows, determining a first source flow via a look-up table relating operator inputs and first source flows, and adding the estimated first valve flow and the determined first source flow.

6. The hydraulic system of claim 1, further including:

a second source of pressurized fluid;

a second plurality of fluid actuators; and a second valve disposed between the second source and the second plurality of fluid actuators, the second valve being movable in response to a third command, the third command being at least partially based on a predetermined flow area of the second valve.

7. The hydraulic system of claim 6, wherein the at least one actuator is a first plurality of actuators, the hydraulic system further including:

a first passageway fluidly communicating the first source, the first valve, and the first plurality of fluid actuators; and a second passageway fluidly communicating the second source, the second valve, and the second plurality of fluid actuators.

8. The hydraulic system of claim 7, further including:

a third valve disposed downstream of the first and second valves and being configured to selectively fluidly communicate pressurized fluid from the second source to at least one of the first plurality of actuators.

9. A method of operating a hydraulic system comprising:

pressurizing a fluid;

directing pressurized fluid toward a first valve, the first valve having a first flow passageway and a first valve stem;

selectively directing an amount of the pressurized fluid through the first flow passageway to a tank; and estimating the flow of pressurized fluid directed through the first flow passageway.

10. The method of claim 9, further including selectively moving the first valve stem to vary the area of the first flow passageway.

11. The method of claim 9, further including:

selectively directing pressurized fluid to a first fluid actuator and moving the first valve stem to a first position; and selectively communicating pressurized fluid to a second fluid actuator and moving the first valve stem to a second position;

wherein an area of the first flow passageway in the first position is different than an area of the first flow passageway in the second position.

12. The method of claim 9, wherein pressurizing a fluid includes pressurizing a first fluid to a first pressure and directing the first fluid at a first flow rate, and pressurizing a second fluid to a second pressure and directing the second fluid at a second flow rate, the method further including:

directing the fluid having the first flow rate toward the first valve;

directing the fluid having the second flow rate toward a second valve;

selectively permitting at least a portion of the first fluid to flow to the tank through the first valve; and selectively permitting at least a portion of the second fluid to flow to the tank through the second valve.

13. The method of claim 9, wherein pressurizing a fluid includes pressurizing a fluid with a first source, the method further including:

determining a first command at least partially based on a look-up table relating operator inputs and displacement values of the first valve at least partially based on the predetermined flow areas;

determining a second command at least partially based on a look-up table relating the displacement values of the first valve and estimated valve flow rates;

determining a third command at least partially based on a look-up table relating operator inputs and first source flow rates;

determining a fourth command at least partially based on the sum of the second and third commands;

selectively communicating the first command to the first valve; and selectively communicating the fourth command to a first source of pressurized fluid.

14. The method of claim 9, further including:

selectively directing pressurized fluid to a first chamber of a first fluid actuator;

selectively directing pressurized fluid from a second chamber of the first actuator to the tank.

15. The method of claim 14, further including:

directing pressurized fluid via a first fluid passageway toward the first valve and toward the actuator; and directing a portion of pressurized fluid from the first fluid passageway to the tank via the first valve.

16. A machine comprising:

an implement;

a frame;

a first hydraulic actuator configured to affect movement of the implement;

a second hydraulic actuator configured to affect movement of at least a part of the frame;

a hydraulic system including:

a tank, first and second sources of pressurized fluid, a first valve configured to selectively permit a pressurized fluid flow to the tank in response to a first area command, and a second valve configured to selectively permit a pressurized fluid flow to the tank in response to a second area command; and a controller configured to determine first and second source commands at least partially based on an estimated flow of pressurized fluid directed through the first and second valves, respectively.

17. The machine of claim 16, wherein the controller is further configured to selectively communicate the first and second area commands to the first and second valves, respectively.

18. The machine of claim 17, wherein the controller is configured to determine the first and second area commands by determining first and second valve displacements at least partially based on first and second look-up tables, each relating operator inputs with predetermined first and second valve displacements to determine first and second valve flow areas.

19. The machine of claim 17 wherein the controller is further configured to determine the first and second source commands by:

estimating first and second fluid flows through the first and second valves at least partially based on third and fourth look-up tables, each relating valve displacements and fluid flows;

determining first and second source flows at least partially based on fifth and sixth look-up tables, each relating operator inputs and source flows;

adding the estimated fluid flow through the first valve to the determined fluid flow through the first source; and adding the estimated fluid flow through the second valve to the determined fluid flow through the second source.

20. The machine of claim 17, wherein:

the first valve includes a flow area configured to permit pressurized fluid through the first valve to the tank; and the controller is further configured to:

determine a plurality of first area commands based in part on a plurality of operator inputs, and communicate the one of the plurality of first area commands resulting in the largest flow area of the flow passageway to the first valve.

21. The machine of claim 17, further including an operator interface configured to selectively communicate operator inputs to the controller;

wherein the controller selectively affects movement of the first and second hydraulic actuators via the hydraulic circuit.

* * * * *